(12) United States Patent
Witt et al.

(10) Patent No.: US 8,976,229 B2
(45) Date of Patent: Mar. 10, 2015

(54) ANALYSIS OF 3D VIDEO

(75) Inventors: Sarah Elizabeth Witt, Winchester (GB); Richard Jared Cooper, Basingstoke (GB)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 13/441,431

(22) Filed: Apr. 6, 2012

(65) Prior Publication Data

US 2012/0257013 A1    Oct. 11, 2012

(30) Foreign Application Priority Data

Apr. 8, 2011 (GB) .................................. 1105973.0

(51) Int. Cl.
*H04N 13/00* (2006.01)
*H04N 15/00* (2006.01)
*H04N 13/02* (2006.01)
*H04N 5/232* (2006.01)

(52) U.S. Cl.
CPC ....... *H04N 13/0239* (2013.01); *H04N 13/0296* (2013.01); *H04N 5/23212* (2013.01); *H04N 2013/0081* (2013.01)
USPC ...................... 348/43; 382/255; 348/E13.064

(58) Field of Classification Search
None
See application file for complete search history.

(56) References Cited

U.S. PATENT DOCUMENTS

| 2008/0240549 | A1 | 10/2008 | Koo et al. | |
| 2009/0148153 | A1* | 6/2009 | Minamide et al. | 396/432 |
| 2009/0231454 | A1 | 9/2009 | Miura | |

FOREIGN PATENT DOCUMENTS

| EP | 2 166 748 | A1 | 3/2010 |
| JP | 2004-289214 | | 10/2004 |
| JP | 2008-103820 | | 5/2008 |
| JP | 2008-103820 | A | 5/2008 |

OTHER PUBLICATIONS

U.S. Appl. No. 13/441,422, filed Apr. 6, 2012, Witt.
United Kingdom Search Report and Written Opinion Issued Jul. 22, 2011, in Great Britain Patent Application No. 1105973.0, filed Apr. 8, 2011.
United Kingdom Search Report and Written Opinion Issued Nov. 10, 2011, in Great Britain Patent Application No. 1105973.0, filed Apr. 8, 2011.
Partial European Search Report issued Sep. 25, 2013 in Patent Application No. 12163314.3.
"Cel-Soft 3D depth chart generator," http://urbanfoxtv.blogspot.de/2011/01/cel-soft-3d-depth-chart-generator.htm, XP055078812, Jan. 27, 2011, 4 pages.
"Cel-scope 3D stereoscopic analyser," http://web.archive.org/web/20100928202810/http://www.cel-soft.com/celscope3d/cel-soft cel-scope3d brochure.pdf, XP055078810, Sep. 28, 2010, 2 pages.

* cited by examiner

*Primary Examiner* — Dave Czekaj
*Assistant Examiner* — Nam Pham
(74) *Attorney, Agent, or Firm* — Oblon, McClelland, Maier & Neustadt, L.L.P.

(57) ABSTRACT

An image analysis apparatus for processing a 3D video signal comprising successive pairs of images representing different respective views of a scene to generate an image depth indicator comprises a correlator configured to correlate image areas in one of the pair of images with image areas in the other of the pair of images so as to detect displacements of corresponding image areas between the two images; a graphics generator configured to generate a graphical representation of the distribution of the displacements, with respect to a range of possible displacement values, across the pair of images; and a display generator for generating for display the graphical representation in respect of a current pair of images and in respect of a plurality of preceding pairs of images, so as to provide a time-based representation of variations in the distribution of the displacements.

5 Claims, 11 Drawing Sheets

ANALYSIS OF 3D VIDEO

CROSS REFERENCE TO RELATED APPLICATION

The present application claims the benefit of the earlier filing date of United Kingdom patent application number 1105974.8, filed in the United Kingdom Intellectual Property Office on 8 Apr. 2011, the entire content of which is incorporated herein by reference.

BACKGROUND

1. Field of the Disclosure

The present invention relates to a method and apparatus for analysing three dimensional (3D) video material.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor implicitly admitted as prior art against the present invention.

Three dimensional (3D) television has recently been made available to the consumer, and it is expected that the amount of 3D equipment and programming will increase rapidly in the next few years.

3D television relies on a stereoscopic technique whereby pairs of images are captured by respective cameras which are laterally displaced (i.e. substantially in a horizontal image direction) by a certain distance, for example a typical spacing of a user's eyes. The pairs of images therefore represent slightly different views of the same scene; in general they will encompass the same items within the scene (except perhaps at the image extremities) but the relative positions of the items between the two images will depend on factors such as the camera alignment and the distance of the items from the camera arrangement.

When the images are displayed, it is important that each of the user's eyes sees (at least mainly) a respective one of the image pair. In practice this is achieved in various ways, such as by the user wearing polarising, time multiplexing or colour-filtering spectacles, or by the television screen itself being provided with a special lens arrangement which diverts each of the two images to a respective eye position of the viewer. Of these, the colour-filtering technique, common in early attempts at 3D cinema, is not generally used in 3D television technology.

Returning to the 3D camera system, each of the pair of images is captured by an independent camera, with its own lens and image capture arrangement (for example a CCD arrangement). But in order to maintain the 3D illusion for the viewer, it is important that the two images of each image pair are closely matched in terms of their image capture properties. Various adjustable parameters are available to the operator of a professional video camera, but the task of setting up a 3D camera arrangement is significantly more difficult than that of setting up a conventional (single) video camera because of the need not only to set the various parameters correctly for the current scene, but also to set the parameters so that the two cameras forming the 3D camera arrangement generate images with identical image properties. In the case of a domestic video camera, the range of adjustments available to the user is much more limited, making it even more difficult to set the two cameras to provide identical image properties.

A further aspect that needs care in 3D video capture is that of the viewer's perception of the video. It is possible for video producers to over-use the 3D effect, particularly by displaying objects (in the 3D video as viewed) so that they appear to be too far in front of the screen. This can cause subjective unpleasantness, or even nausea, for the viewer. Similarly, changes in display depth which are abrupt or simply too rapid can also cause subjective unpleasantness. It has been postulated that this is because the 3D display tricks the human psychovisual system into believing that an object is at a distance from the viewer which is different to the separation between the viewer and the display screen. The viewer's eyes instinctively attempt to focus on the perceived 3D position of an object, particularly as it gets closer to the viewer than the display screen. However, for viewing a 3D video the eyes must of course continue to focus on the plane of the display screen.

This invention provides an image analysis apparatus for processing a 3D video signal comprising successive pairs of images representing different respective views of a scene to generate an image depth indicator; the apparatus comprising:

a correlator configured to correlate image areas in one of the pair of images with image areas in the other of the pair of images so as to detect displacements of corresponding image areas between the two images;

a graphics generator configured to generate a graphical representation of the distribution of the displacements, with respect to a range of possible displacement values, across the pair of images; and a display generator for generating for display the graphical representation in respect of a current pair of images and in respect of a plurality of preceding pairs of images, so as to provide a time-based representation of variations in the distribution of the displacements.

The invention also provides an image analysis apparatus for processing an image to generate an image focus indicator, the apparatus comprising:

a focus detector configured to detect respective local focus estimates for a plurality of blocks of the image, and to combine the local focus estimates to generate the image focus indicator for that image.

Further respective aspects and features of the invention are defined in the appended claims. It is to be understood that the foregoing general description of the invention and the following details description are exemplary, but are not restrictive, of the invention.

BRIEF DESCRIPTION OF THE DRAWINGS

A more complete appreciation of the disclosure and many of the attendant advantages thereof will be obtained as the same becomes better understood by reference to the following details description when considered in connection with the accompanying drawings, in which.

DESCRIPTION OF THE EMBODIMENTS

Figure 1:
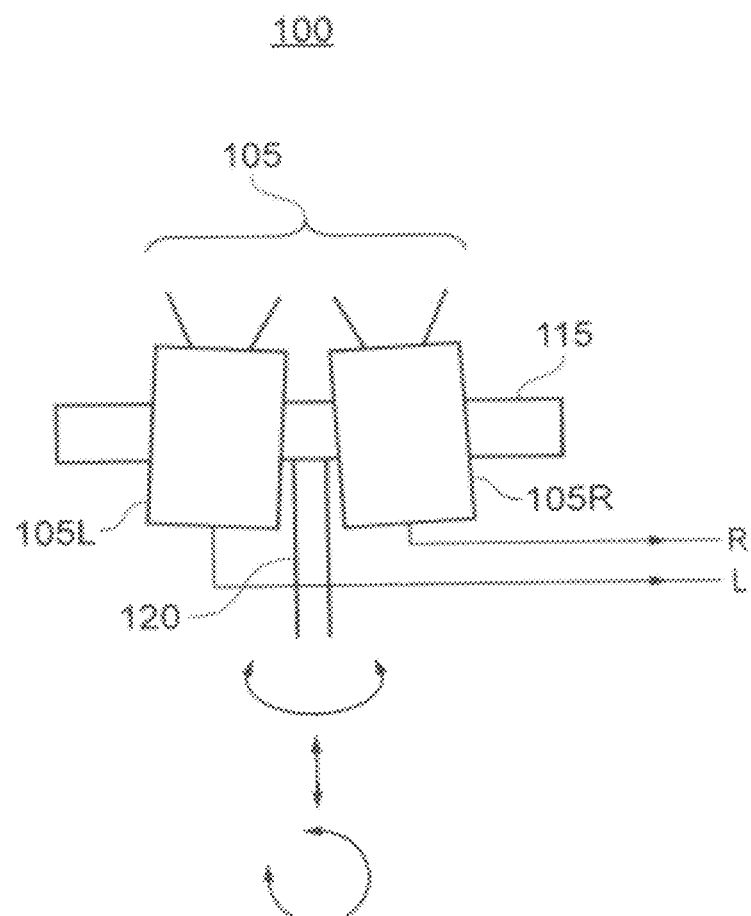
FIG. 1 schematically illustrates a 3D camera system.

Reference is made to the drawings, in which like reference numerals designate identical or corresponding parts throughout the several views.

Embodiments of the present invention operate with respect to three dimensional (3D) television signals. The embodiments are generally independent of the source of such signals. That is to say, the apparatus can operate so as to generate a qualitative assessment of a 3D television signal, of whatever origin, that is supplied to the apparatus. This could be a direct feed from a 3D camera arrangement, a computer-generated or computer-enhanced 3D signal, a 3D signal replayed from a recording medium, a 3D signal received from another provider over a transmission medium, the output of a 3D video processing apparatus such as a vision mixer, and so on. However, for clarity of the present explanation, a brief description will be provided of a 3D camera arrangement as one possible source of such a 3D signal.

Referring to FIG. 1, a system 100 for capturing images of a scene for use in generating a 3D image is shown. The system 100 has a camera rig 115 upon which two cameras 105 are mounted. These cameras 105L and 105R may be video cameras or stills cameras. The remainder of this description will relate to video cameras, but it will be appreciated that those aspects of the techniques which do not depend on the time relationship of successive video frames are equally applicable to stills cameras.

Although not shown explicitly in FIG. 1, the yaw of the cameras 105 relative to one other can be changed. Specifically, whilst mounted on the rig 115, the pitch and roll of each camera 105 are usually fixed relative to one another. However, the yaw of the cameras 105 can be adjusted independently of one another. This allows the cameras' convergence angle or "toe-in" to be changed. Once the cameras are locked in place (i.e. fixed to the rig 115), the yaw, pitch and roll of the rig 115 and the cameras can be moved in unison. The yaw, pitch and roll of the rig 115 is moved by an arm 120. The orientation of the rig 115 can be locked in place by twisting the arm 120.

The output feed from each camera 105 comprises a respective one of the left (L) and right (R) signals which together form a 3D video signal. Accordingly, these outputs include image data. However, other data may also be fed out of each camera. For instance, metadata may be also fed out of each camera. The metadata may relate to the camera settings, such as aperture settings, focal length and/or zoom of each camera.

Additionally, the metadata may include information about the camera operator or "good shot markers" or the like. The output feeds from the cameras 105 may be connected to subsequent processing apparatus using wires or over a network. The connection between the cameras 105 and subsequent processing apparatus may be wireless.

Figure 2:
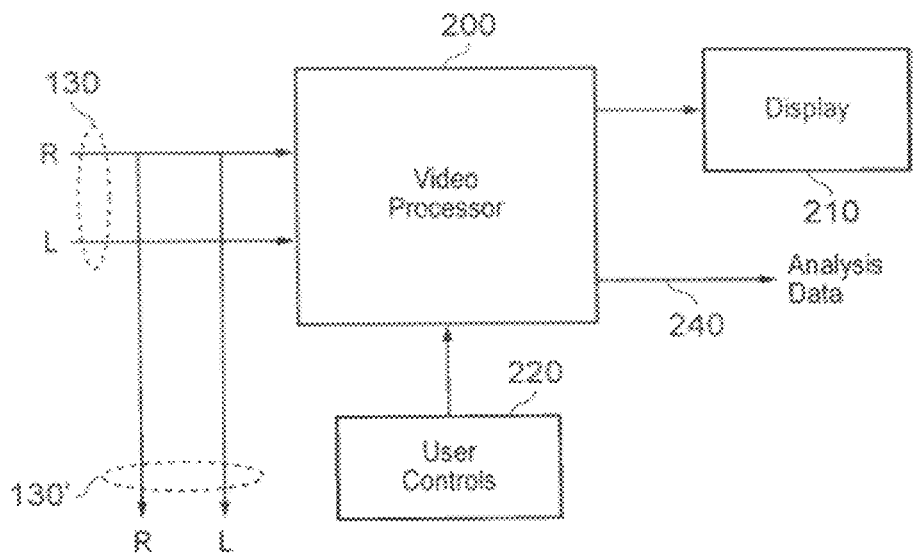
FIG. 2 schematically illustrates a 3D video analysis apparatus.

FIG. 2 schematically illustrates a 3D video analysis apparatus according to an embodiment of the present invention. The apparatus of FIG. 2 comprises a video processor 200, a display 210 and user controls 220. In embodiments of the invention, the analysis can be carried out in real time, which is to say that the analysis relating to a video frame can be completed within a video frame period.

A 3D video signal 130 comprising (at least) R and L video streams is supplied to the video processor 200. The video processor 200 is operating in an analysis mode, which is to say that it does not form part of the video signal path, but rather it analyses the video signal without necessarily making any alterations to the video signal. Therefore, in FIG. 2 the video processor 200 is shown connected as a branch to the main video signal path, with the L and R video streams being passed (130') to subsequent processing, display or storage unchanged by the operation of the video processor 200.

The video processor 200 carries out analysis of the 3D video signal 130. The nature of the analysis will be described below. The results of the analysis can be displayed on a display 210 or provided as a data stream 240 for subsequent processing and/or storage.

The user controls may include conventional controls such as a keyboard, a mouse or the like, and allow the user to control the operation of the video processor 200.

Figure 3:
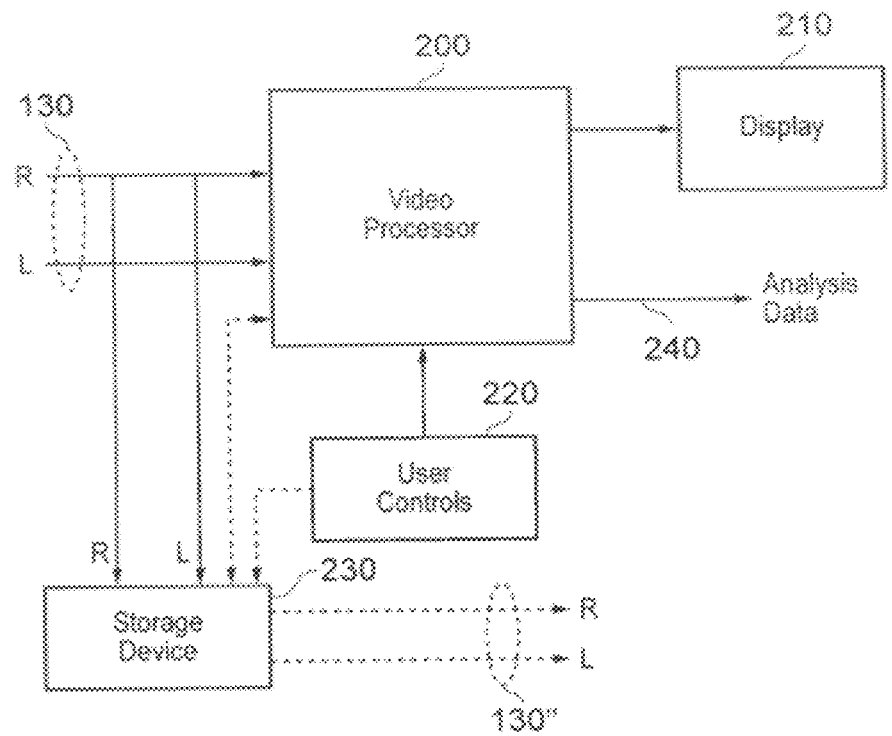
FIG. 3 schematically illustrates another embodiment of a 3D video analysis apparatus.

FIG. 3 schematically illustrates another possible mode of operation of the video processor 200. In many respects the operation is similar to that shown in FIG. 2. However, a video storage device 230 such as a video tape recorder, a hard disk recorder, and optical disk recorder or the like is also provided.

The signal handling is as follows. The received 3D signal 130 is supplied to the video processor 200 for analysis and is also supplied to the storage device 230 for storage. The analysis results from the video processor 200 are optionally supplied (as described before) to the display 210 and as a data output 240. However, the analysis results are also stored by the storage device 230 as metadata associated with the stored 3D video signal.

The storage of metadata associated with a video signal can be achieved in various ways. For example, a separate store of metadata can be provided, with a link (such as a stored time code variable) being provided in order to provide a clear association between an item of metadata and a corresponding temporal position in the stored video signal. In this situation, it is not actually necessary for the metadata to be stored by the same storage medium as the video signal, or even by the same physical device—so that the generic item in FIG. 3 labelled for simplicity as "storage device" may in fact encompass two or more physical or logical storage arrangements, at least one of which could even be physically embodied as part of the video processor 200. Another possibility is to embed the metadata into the stored video signal, for example by storing the metadata as user data within the data format associated with the video signal. Depending on the type of video storage used, this may require a buffer (not shown) to delay the recording of a video frame until the metadata derived by the video processor 200 is ready to be embedded into the video data. This would be appropriate for linear media such as tape storage, but less necessary (or not necessary at all) for random-access media such as disk-based storage. For a system operating in real time, it is desirable that the video processor 200 completes its processing of a video frame within a single frame period, so, for example, a single frame buffer may be used.

The stored video signal, with or without the metadata generated by the video processor 200 can be replayed as an output 3D video signal 130".

In the arrangement of FIG. 3, the video processor still does not have any direct effect on the actual video signal (other than to associate metadata with the video signal). However, the present embodiments do not preclude the video processor from altering the video signal; it is just that the specific functionality to be described below relates to the analysis, rather than the alteration, of the video signal 130.

In FIG. 3, the user can initiate replay of the video signal stored by the storage device 230, either directly, in the sense that the user controls can interact directly with the storage device 230, or indirectly, in the sense that the user can interact with the video processor 200 which in turn initiates replay of the stored video signal. The relevance of these types of operation will be described below.

The video processor 200 may be implemented as a general purpose data processing machine, such as a personal computer, operating under appropriate software control. However, in embodiments of the invention, the video processor 200 is implemented as a Sony® MPE-200™ stereo image processor operating under appropriate software control. The storage device, or at least that part of the functionality of the storage device which relates to the storage of the actual video signals, may be implemented by a Sony® SRW-5100™ high definition stereo video tape recorder. Both of these devices are available for purchase at the priority date of the present application.

Figure 4:
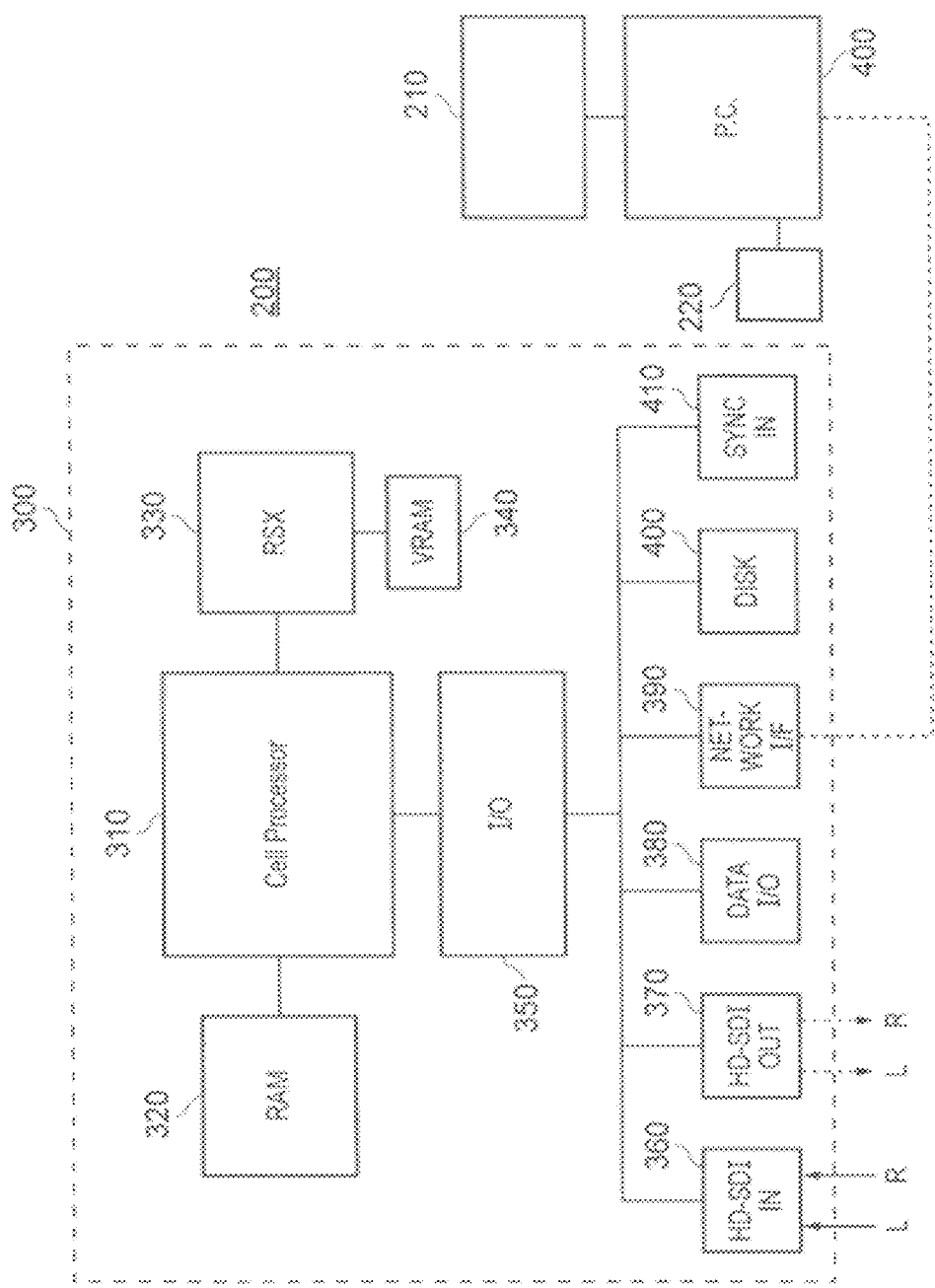
FIG. 4 schematically illustrates a video processor.

FIG. 4 is a schematic block diagram illustrating the structure of the MPE-200 video processor and associated hardware, and will be described briefly in order to provide technical background to the operation of the video processor 200.

Referring to FIG. 4, the video processor 200 comprises a stereo processing apparatus 300 (which may be implemented as the MPE-200 device) and a control computer 400.

It will be appreciated that software controlling the operation of either of the devices 200 or 400, and/or a computer program product comprising a storage or other machine-readable medium by which such software is stored or otherwise provided, are considered to form embodiments of the present invention.

The stereo processing apparatus 300 can be (for example) designed around a Cell Processor 310 and comprises random access memory 320, a Reality Synthesiser graphics unit (RSX) 330 with a dedicated video random access memory (VRAM) 340 and an input/output (I/O) bridge 350, all linked together by a bus arrangement. The I/O bridge 350 provides an interface to peripheral components including: video input and output connections comprising a high definition serial digital interface (HD-SDI) input 360 and an HD-SDI output 370, an RS-232C data I/O port 380, one or more network interfaces 390, non-volatile (for example, hard disk) storage 400, and a video synchronisation signal input 410.

The control computer 400 is connected to the stereo processing apparatus 300 via the network interface and a corresponding interface (not shown) on the control computer. The control computer has a similar internal structure to that of the stereo processing apparatus, except that the control computer uses conventional personal computer processing devices rather than the Cell Processor. The control computer 400 provides a user interface to control the operation of the stereo processing apparatus, and connects its own personal computer format display 210 and to the user controls 220. The stereo processing apparatus can also have its own display connected via the HD-SDI output terminals.

The RSX unit 330 is a video accelerator based upon the NVidia® G70/71 architecture that processes and renders lists of video rendering commands produced by the Cell processor 310.

Figure 5:
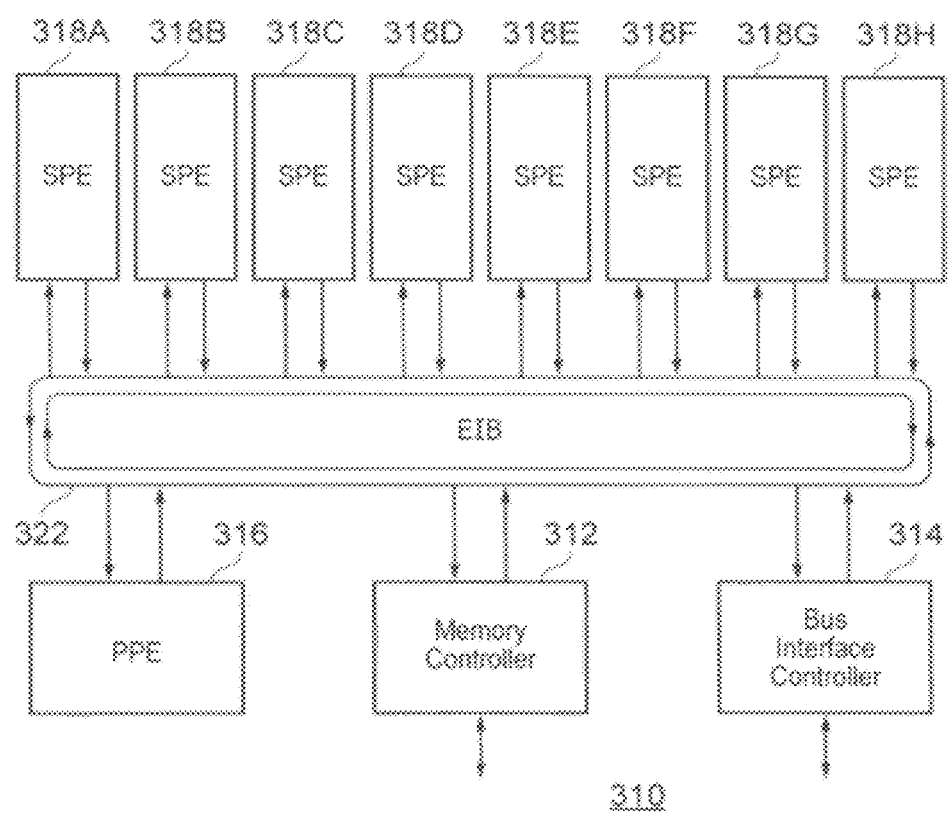
FIG. 5 schematically illustrates a Cell Processor.

Referring now to FIG. 5, the Cell processor 310 has an architecture comprising four basic components: external input and output structures comprising a memory controller 312 (for interfacing with the system RAM 320) and a dual bus interface controller 314 for interfacing with other components of the stereo processing apparatus 300; a main processor referred to as the Power Processing Element (PPE) 316; eight co-processors referred to as Synergistic Processing Elements (SPEs) 318A-H; and a circular data bus connecting the above components referred to as the Element Interconnect Bus 322.

The PPE 316 is based upon a two-way simultaneous multithreading PowerPC core with an associated 512 kB level 2 (L2) cache and a 32 kB level 1 (L1) cache. The primary role of the PPE 316 is to act as a controller for the Synergistic Processing Elements 318A-H, which handle most of the computational workload. In operation the PPE 316 maintains a job queue, scheduling jobs for the Synergistic Processing Elements 318A-H and monitoring their progress. Consequently each Synergistic Processing Element 318A-H runs a kernel whose role is to fetch a job, execute it and synchronise with the PPE 316.

Each Synergistic Processing Element (SPE) 110A-H comprises a respective Synergistic Processing Unit (SPU), a respective Memory Controller and a respective bus interface. The internal structure of the SPEs is not shown, for clarity of the diagram. Each SPU is a RISC processor which can operate on 4 single precision floating point members, 4 32-bit numbers, 8 16-bit integers, or 16 8-bit integers in a single clock cycle. In the same clock cycle it can also perform a memory operation.

The EIB 322 is a logically circular bidirectional communication bus internal to the Cell processor 310 which connects the above processor elements. The connected elements can simultaneously read and write to the bus at a rate of 8 bytes per clock cycle.

In operation, the PPE and the SPEs operate under software control. The software may be retrieved from the non-volatile storage 400 and/or received via the network interface 390, and stored in the RAM 320 for execution. Control signals including operational instructions and settings are provided by the control computer 400. In response to such control signals, the PPE 316 allocates tasks and controls the operation of the individual SPEs.

In embodiments of the invention the stereo processing apparatus is able not only to process video, but to manipulate 3D objects, shading and lighting, mapping video in real-time onto moving surfaces. In the present embodiments, however, it is used to assess the quality of a received 3D video signal. Techniques for achieving this will now be described.

Figure 6:
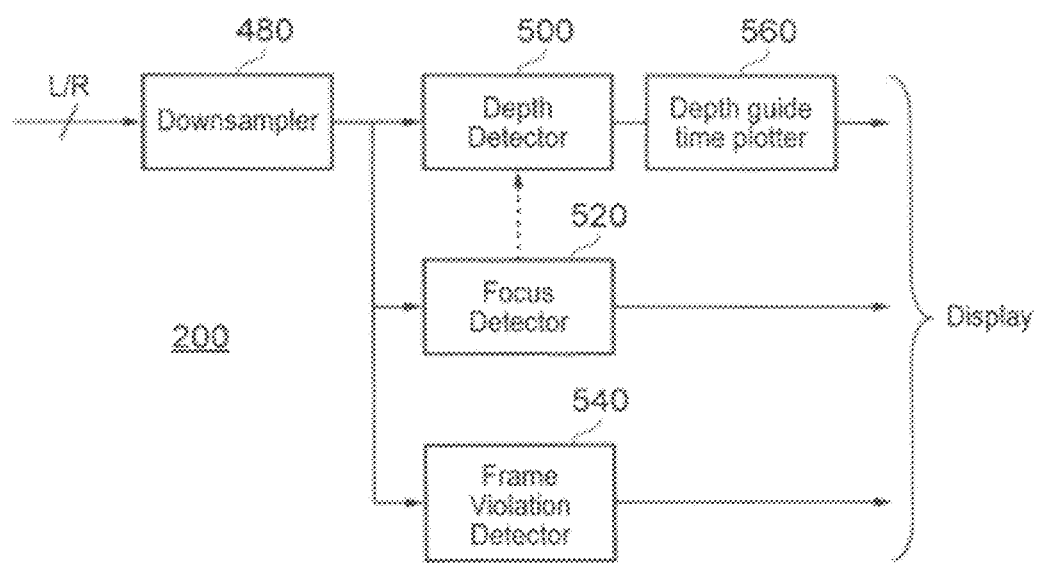
FIG. 6 is a schematic diagram providing an overview of the operation of a video processor in respect of received 3D (L/R) video signals.

FIG. 6 is a schematic diagram providing an overview of the operation of the video processor 200 in respect of received 3D (L/R) video signals.

The video processor 200 acts as a downsampler 480, a depth detector 500, a focus detector 520, a frame violation detector 540 and a depth guide time plotter 560. Output data generated by the depth guide time plotter 560, the focus detector 520 and the frame violation detector 540 are rendered for display (on the display 210) by the control computer 400. These functions of the video processor 200 are implemented by the SPEs of the Cell Processor 310 operating under appropriate software control. The way in which these functions operate, and the manner of display of the resulting analysis data, will be described below.

Downsampling

The downsampler 480 downsamples the incoming left and right video images to a quarter size, for example 480×135 pixels for incoming 1920×1080i video, using a single SPU. This allows the subsequent processing to operate more efficiently on the downsampled video, without noticeable loss of analysis quality. The downsampling process itself is conventional.

Depth Analysis

Figure 7:
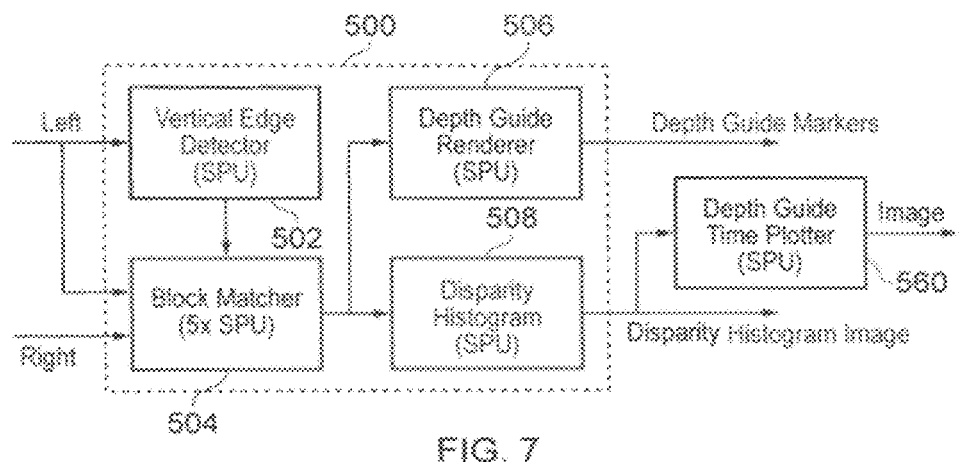
FIG. 7 schematically illustrates a depth detector and a depth guide time plotter.

FIG. 7 schematically illustrates the depth detector 500 and the depth guide time plotter 560. In embodiments of the invention this functions to process a 3D video signal comprising successive pairs of images representing different respective views of a scene to generate an image depth indicator.

The depth detector 500 comprises a vertical edge detector 502, a block matcher 504, a depth guide renderer 506 and a disparity histogram generator 508. The number of SPUs (that is to say, the number of SPEs) allocated to the various processes in embodiments of the invention is indicated in parentheses.

The first stage in the Depth Analysis is detection of vertical edges in the left image. The vertical edges are assumed to be the same in the right image; the choice of the left image for the identification of edges is an arbitrary one. To achieve this, the vertical edge detector 502 breaks down the quarter size image (output by the downsampler 480) into 8×8 blocks and detects possible edges in each block using a vertical Sobel edge detector. The output for each block comprising either a single edge position (if a strong edge is found, that is to say, an edge for which the edge detection process exceeds a threshold edge likelihood, which implies that the edge is (a) at or near to vertical (for example, within a threshold angle of vertical), and/or (b) sharply defined in the image block) or an indication that no edge (that is, no strong edge) was found in that block. So, for example, a sharply defined edge more than the threshold angle away from vertical can be deemed not to represent a detection of an edge. These outputs are collated into a list of edge positions across the image.

The list of edge positions is then used by the block matcher 504 (again running in an SPU). This acts as a correlator configured to correlate image areas in one of the pair of images with image areas in the other of the pair of images so as to detect displacements of corresponding image areas between the two images. The block matcher operates on each detected edge (as detected according to the criteria described above) and searches for similarity between a 16×16 block of the quarter-size left image, centred on that edge position, and a corresponding block or search area in the surrounding area of the right image.

In other words, the block matcher 504 attempts to match the region around a detected edge in the left image to a region of similar or substantially identical image content in the right image, in order to detect a spatial offset between the corresponding image areas. In 3D video from a well set-up 3D source, the expectation would be that the spatial offset is only in the horizontal direction. That is to say, ideally a 3D video camera (such as that shown in FIG. 1) should be set up so that the two cameras 105L, R are vertically aligned. On this basis, any vertical component of the displacement can be ignored in the processing described below.

The block matching process is configured not to carry out block matching in respect of blocks which are not detected to contain an edge.

The horizontal offset between corresponding image features is an indication of the depth of that feature relative to the camera position, or in other words, the distance of that image feature from the camera position in a direction normal to the image planes. In a camera arrangement in which the cameras are aligned so as to converge, the image planes of the two cameras will be slightly offset from being parallel. In such a case, the depth may be considered to represent in part the distance away from the camera position in a direction representing an average of the two normal directions relative to the two respective image planes.

The horizontal offset does not, on its own, provide a definitive measure of distance from the camera position. Other factors are relevant, including the lateral separation of the cameras and the convergence angle of the cameras. These other factors cannot be detected from the left and right images alone, though they may be defined in metadata associated with the video signals. However, if the lateral separation and convergence remain generally constant (which is extremely likely from image to image within a video signal), the horizontal offset does represent a useful qualitative indicator of distance from the 3D camera, even if a calculation of the absolute distance would require further information. With all this in mind, for ease of discussion, the term "depth" will be used here to indicate a measure which is dependent only on the horizontal offset of the two images. The "depth" measurement is therefore associated with the perception of depth by the viewer, when the image is viewed, than an actual physical distance from the camera at the time of capturing the content. At the time of viewing, the depth is a measure of the distance out of or behind the screen that an object appears to be situated. This is dependent in part upon the size of the viewer's display screen.

The search area in the right image is ±48 pixels and ±3 lines around the original position, that is to say, around the position in the right image corresponding to the detected edge position in the left image. The block match process uses a known "sum of absolute differences" (SAD) technique to find the closest matching position in the right image. That is to say, the absolute differences between corresponding pixels in the 16×16 block of the left image and a 16×16 test block in the right image are summed, and the block position (in the right image) which gives rise to the lowest such sum is taken to represent the best match of image content between the left and right images.

A known problem with block matching using a SAD analysis is that so-called aliasing can occur, particularly if the images contain repeating patterns in the search area of the right image. The repeating patterns can lead to the detection of multiple minima amongst the SAD data, and therefore an ambiguous result for the horizontal offset. To address this potential problem, an "aliasing probability" is also calculated for each block match result, based on a detection of multiple SAD minima in the block match results indicating a repeating pattern in the images. There may still be a single "most minimum" or primary minimum value, but other minima are detected if (a) they are local minima and (b) (optionally) they are separated, in block position, from the primary minimum value by at least a predetermined separation with respect to the test block. Results with a high aliasing probability (that is to say, results for which the block match process generated multiple SAD minima) are excluded from the depth results.

A "coverage estimate" equal to the number of blocks for which a match is found, divided by the total number of blocks, is generated. This indicates a degree of confidence in the block match data.

The horizontal offsets detected by the block matcher are passed to the depth guide renderer 506, which operates as another SPU process to draw coloured depth markers onto a plain (zero alpha) texture buffer which can then be rendered as an overlay onto an analysis display of the video signal, to indicate points that exceed a "depth budget" set by the user. Alternatively, all measured disparities can be rendered, which can be useful for checking that the left and right inputs are the correct way round.

A correct and pleasing perception of depth by a viewer of a 3D video display is subject to several factors, but one significant factor which lends itself to analysis by the present apparatus is whether the depth values across the images (that is, the detected horizontal offsets) lie within a depth budget set by the video producer. A typical depth budget might be ±3%, which is to say that the absolute horizontal offset between corresponding features in the left and right images should never exceed 3% of the horizontal size of the image.

Figure 8:
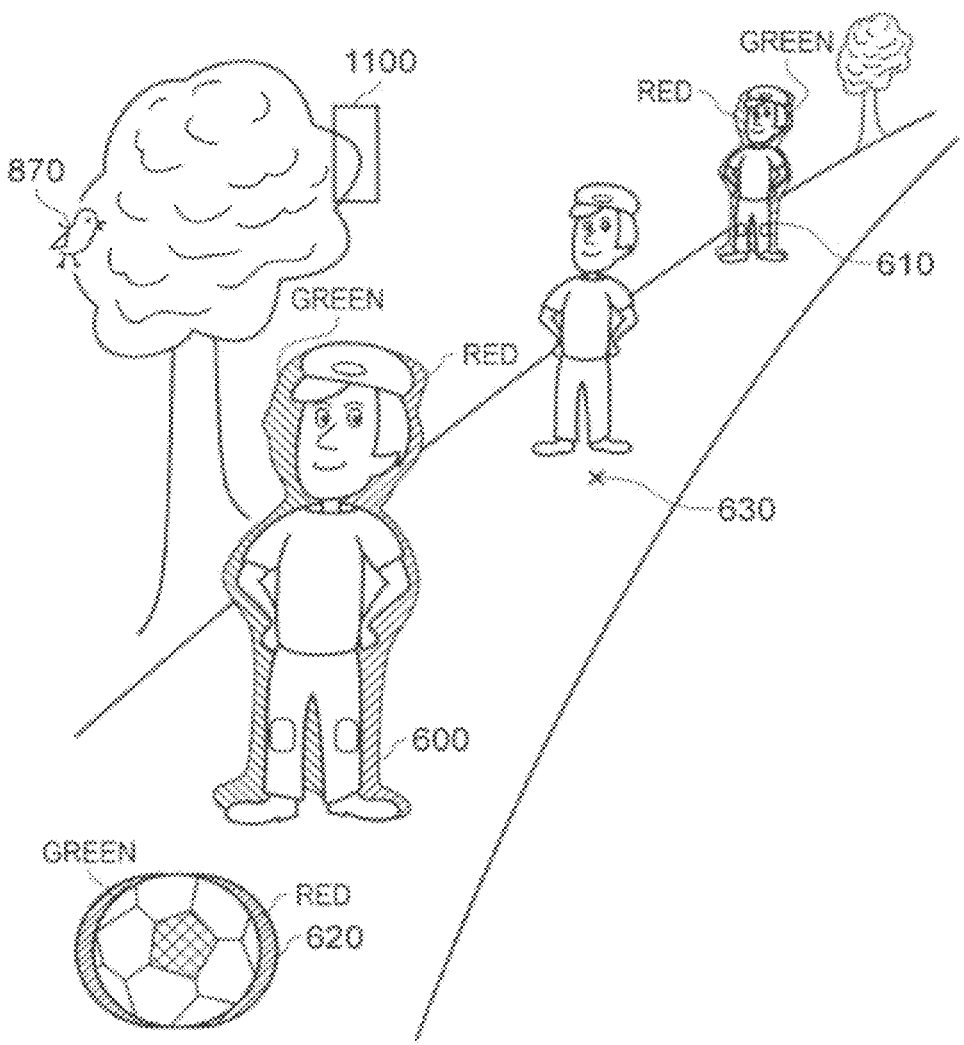
FIG. 8 is a schematic example image.

FIG. 8 schematically illustrates these concepts, and also schematically illustrates the manner in which the depth guide renderer 506 is arranged to indicate depth values (representing an image depth indicator) in a convenient manner to the operator of the video processor 200.

FIG. 8 schematically illustrates a 3D image, rendered for display on a two-dimensional display such as the display 210. The rendering process combines the left and right images. Because the left and right images were captured from different respective camera positions, there are different amounts of horizontal offset at different positions within the rendered image, depending on the distance of the corresponding image feature from the camera position. The rendered image represented in FIG. 8 is provided as part of an image analysis system and so it is desirable to indicate, rather than to attempt to mask, such horizontal offsets.

A simple combination of the left and right images (for example, a simple 50% contribution from each) would give rise to a rendered 2D image that is hard to assess, as the horizontal offset would just cause many images features to appear as double images. It would not be apparent from such a simple combination which part of such a double image originated in the left image, and which part originated in the right image. So to make the rendered image clearer to the user, a coloured representation is employed.

In particular, the 3D image is rendered for display as a red/cyan anaglyph so that the 2D displayed image comprises:

$$R_{out}=R_L; G_{out}=G_R; B_{out}=B_R$$

where R, G, B represent red, green and blue components, the subscript "out" indicates a value for display, and the subscripts L and R represent components from the left and right images respectively.

This coloured representation means that (a) the two images (L and R) can be easily distinguished on the display, and (b) the direction of the horizontal offset can easily be seen by the user. Where an object lies at the point at which the camera axes of the left and right cameras of a 3D camera converge, there will be no horizontal offset and so the object will appear correctly rendered as a colour object. Where an object is further from the 3D camera than the convergence point, it will appear displaced to the right side in the right image and displaced to the left in the left image, and so will have a cyan border to its right and a red border to its left. Where an object is closer to the 3D camera than the convergence point, it will appear displaced to the left side in the right image and displaced to the right side in the left image and so may have a red border to its right and a cyan border to its left. The actual colours depend on whether the foreground or background part of the image is brighter, but for the purposes of this embodiment, the colour representation used is the same as a standard red/cyan anaglyph, so that these situations can therefore be easily distinguished in the coloured representation. Of course, this is just one example of a format for displaying two 3D images as a single 2D image. Other formats could be used, such as a simple 50:50 mix of the two images. The aim is to provide a 2D representation of the 3D material to form a basis on which error or quality markers (see below) can be displayed or overlaid.

FIG. 8 is a monochrome patent drawing and so has to indicate these coloured borders using shading. In a real image, the coloured border effects would of course apply to every image feature apart from those representing objects at the convergence point of the left and right cameras. However, for clarity of the diagram, not every object in FIG. 8 has been annotated to indicate the coloured borders. In particular, only a front person 600, a rear person 610 and a ball 620 have been annotated in this way. The shading indicates that the person 600 and the ball 620 are in front of the convergence point 630 of the 3D camera, whereas the person 610 is behind the convergence point 630.

The depth guide renderer 506 renders depth information onto an image of this type. As mentioned above, it achieves this by rendering depth guide information into a texture (or image) buffer containing a blank image, which is to say, an image of zero alpha value. The alpha value determines the transparency of the associated image, with zero representing full transparency. So, if an image region having an alpha value of zero is combined with another image, it has no effect on that other image. The depth markers are rendered onto this zero alpha background, but in such a way that the depth markers have a non-zero alpha value, for example an alpha value of 0.5 (50% transparency) so that the depth markers will show up on a combination of the depth guide renderer's output and the rendered 2D image, but will not fully obscure the rendered 2D image beneath.

In an embodiment, the depth guide renderer generates indicators only in respect of image regions where the absolute detected horizontal offset is greater than the depth budget (which may be predetermined or may be set by the operator using the user controls 220). An example of the use of such indicators is illustrated schematically in FIG. 9, which shows just the ball 620 of FIG. 8 but (for clarity of the diagram) without showing the ball's markings. The ball is the closest object to the 3D camera and its horizontal offset as detected between the left and right images exceeds the depth budget which has been set for this video signal. To indicate this, markers 640, 650 are rendered by the depth guide renderer 506 indicating positions at which the depth budget has been exceeded. Note that the markers are shown aligned with vertical features of the ball's shape; depending on the tolerances used by the vertical edge detector, it is likely that only part of the ball's shape will be detected as containing an edge, because many features of the ball are nearer to being horizontal rather than vertical edges. In the present example, only the part of the ball's outline having a near-vertical tangent has been detected as having a vertical edge. Since in embodiments of the invention only those positions having detected vertical edges are passed to the subsequent processing (block matching and depth guide rendering), the depth budget warning markers are generated at such positions.

As mentioned earlier, depth guide indicators can be generated by the depth guide renderer in respect of all image positions at which vertical edges were successfully detected. The indicators could be (for example) colour coded to indicate the depth (that is, the horizontal offset) detected at that position. The colour coding could be based on the absolute depth value, so being independent of the sign of the depth value, or could be different for positive and negative horizontal offsets. The colour coding could be based on bands of depth values, for example, one colour if the depth value is less than 2% of the image width, a second colour if the depth value is between 2 and 5% of the image width, and a third colour if the depth value exceeds 5%. Or the colour change could be on a graduated scale, so that (for example) a depth value of 0 is represented by a green indicator, with the colour of the indicator gradually becoming more yellow and then more red as the depth value becomes more negative. An example of such a continuous colour variation is indicated (within the limits imposed by a monochrome drawing) in FIG. 10.

Where the sign of the depth value is to be indicated, a convention is applied so that, for example, depth values indicating that the object is closer to the camera than the convergence point are considered as negative depth values, and depth values indicating that the object is further from the camera than the convergence point are considered to be positive depth values. However, this is just a convention and the other polarity could be used to represent the depth values.

Figure 9:
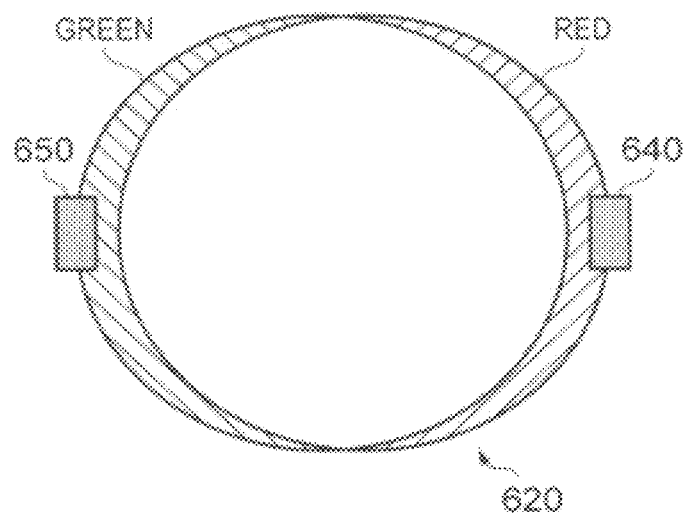
FIG. 9 schematically illustrates a portion of the image of FIG. 8.
Figure 10:
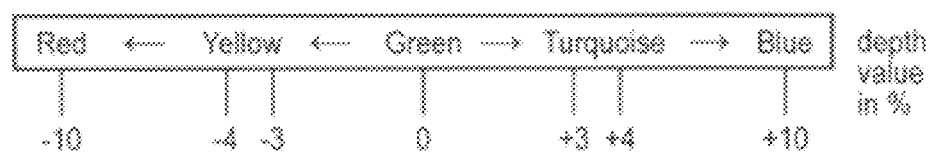
FIG. 10 schematically illustrates a colour representation scale.

So, using the colour representation of FIG. 10 with regard to the drawing of FIG. 9, the ball 620 is closer to the camera than the convergence point, and so the depth value is considered to be negative. The markers 640, 650 are therefore both either yellow or red, depending on the magnitude of the depth value.

Note that in some embodiments, the colour coding of the type illustrated in FIG. 10 can depend on the depth budget. So, for example, the boundary between green and yellow could be arranged to lie at approximately the level of the depth budget (−3% in this example), with the user being able to set a second, higher, threshold (±4% in the example of FIG. 10) at which a further colour change occurs. So the arrangement would be that the user sets the depth budget and one or more other thresholds, and the system maps the colour variations similar to FIG. 10 onto possible depth values so as to generally align significant colour changes with the thresholds. Of course, the colour variation is continuous in FIG. 10, so there is no single well-defined boundary between one colour and the next. However, a notional boundary where the colour goes from being predominantly one colour to being predominantly another colour can be derived and positioned with respect to the depth budget and possible other threshold values as described here.

The horizontal offsets measured by the block matcher (across the whole image) are also combined to form a horizontal disparity histogram by the disparity histogram generator 508. The histogram generation involves counting instances of horizontal offsets for each possible offset value or "bin". The bins are ordered according to the pixel offset values (detected displacements) detected by the block matcher, which is to say that 97 such bins are provided between offset values of −48 and +48 pixels. Note that these pixel offset values are derived with respect to pixels of the quarter size images being processed, and can readily be converted to percentage depth values by (a) dividing by the pixel width of the image in question, and (b) multiplying by 100. Note also that the bins could be arranged so that there are fewer bins, but each bin encompasses a range of pixel offsets. For example, the bins could be several pixel values wide. Each bin therefore represents one or more possible displacement values.

The histogram data are assigned colours, using the same colour coding scheme as that described with respect to FIG. 10. Note that FIG. 10 is calibrated in percentage depth values, whereas the bins may be arranged by pixel offset, but as described above one can readily be converted to the other.

Figure 11:
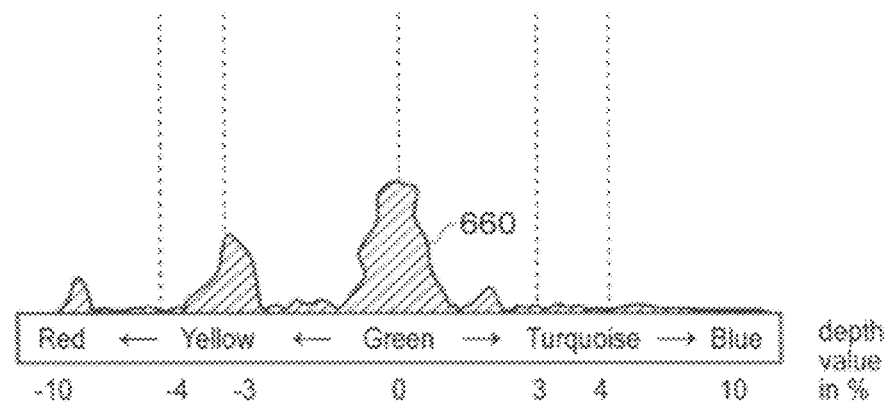
FIG. 11 schematically illustrates a depth histogram.

A schematic example of a colour coded histogram is illustrated in FIG. 11. The histogram is displayed according to depth values rather than pixel offsets. The colour coding scheme from FIG. 10 is adopted and, indeed, is displayed as part of the representation of the horizontal (bin) axis. The vertical extent of the histogram at any horizontal position indicates the population of the corresponding bin at that depth value. The shaded area 660 is coloured according to the colour relevant to horizontal position. So, within the shaded area 660, the colour varies with horizontal position according to the colour scheme of FIG. 10, but the colour does not vary with vertical position.

The histogram of FIG. 10 is updated for each successive image of the video signal. The display of the histogram can also be updated at each image period.

Figure 12:
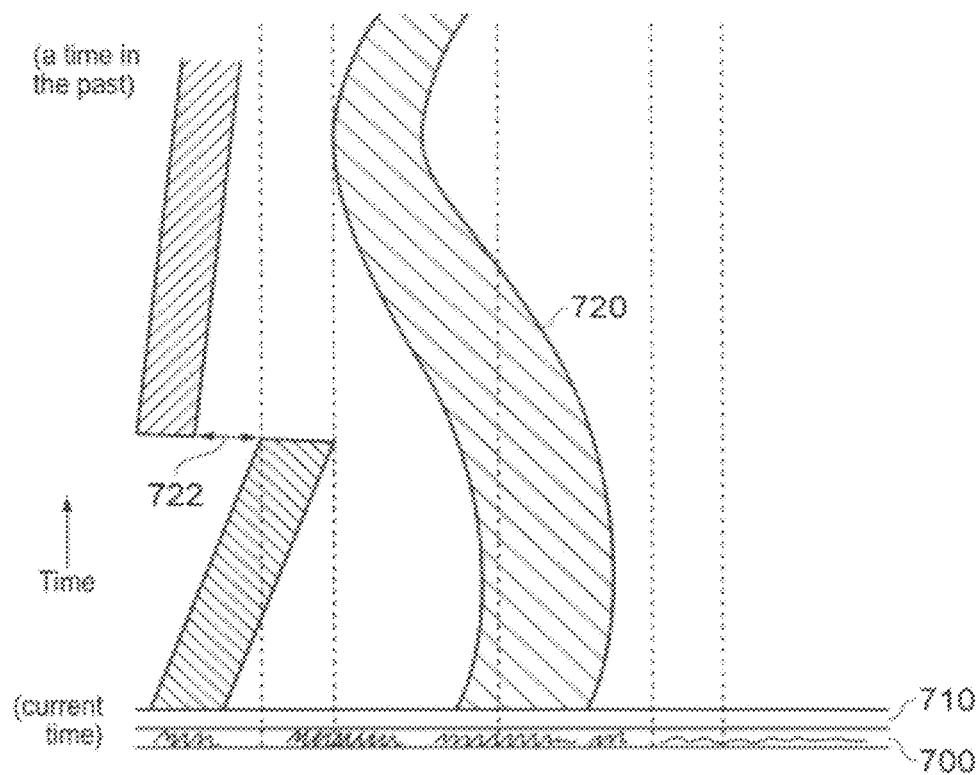
FIG. 12 schematically illustrates a histogram history display.

The depth guide time plotter 560 stores and displays a recent history of the disparity histogram. A schematic example of such a history display is shown in FIG. 12. The display may be shown simultaneously on the same screen as the display of FIG. 11.

Time is represented on a vertical axis, with increasing time before the current time being represented by increasing distance from the bottom of the representation. The representation is divided into rows 700, 710 . . . Row boundaries (horizontal lines) are shown in FIG. 12 for the purposes of explanation, but these would not be displayed on the actual display screen.

The bottom row 700 of the representation is used to display the depth histogram derived the current image (for example, the current frame). Because the display is limited to a narrow row, it is not possible to represent this aspect of the histogram in the same way as FIG. 10. So, instead, the height or bin occupancy of the histogram is represented by the brightness or intensity of a corresponding display point having a colour associated with that bin or depth value. The height can therefore be represented by display intensity, and the displacement value can be indicated by one or both of a display position and the colour of that display point. This is achieved by setting the alpha (transparency) value associated with a position along the row to be dependent upon the histogram height at that position, so that alpha is greater (less transparent, more opaque) for greater histogram heights. The displayable points in the row may represent a contiguous line of displayable points. A similar row, above the row 700, is displayed in respect of each of the historical histograms (not shown in FIG. 12).

As each new image is processed, the graphical representation is redrawn so that the previously current histogram row 700 is moved upwards to the next higher row position 710 (representing a next-older image), and a new current histogram is drawn in the current pair display position, which is the row 700, so as to form a time-ordered stack of lines of display points, each line corresponding to a histogram representation of a respective pair of images in a time order of the pairs of images. In general terms, when a new row 700 is available, each row of the entire display moves up by one row position, except for the row that was at the top of the display, which is discarded. This provides a historical display of the histogram data for a time period equal to the number of rows multiplied by the image rate of the video signal. The result is that trends in the depth data can be observed as vertically displayed patterns such as the pattern 720.

To achieve this, the depth guide time plotter 560 comprises a buffer memory for storing n most recent histograms, where n is the number of rows that can be displayed on the display of FIG. 12. The depth guide time plotter also comprises logic for rendering the stored histograms as successive rows in the display.

The historical display is also suitable for use with the embodiment of FIG. 3, in which metadata defining the quality of the 3D material may be stored on the storage device 230, and the video processor 200 has replay control of the storage device 230. For example, if the operator of the video processor notices a discontinuity in the historical depth data, such as the discontinuity 722 in FIG. 12, the operator can instruct the storage device 230 (via the user controls 220) to replay the section of video around the discontinuity, for example from two seconds before the discontinuity to two seconds after the discontinuity. The operator can do this by, for example, double clicking a mouse control at the temporal position of the desired replay within the area of the historical depth data display. The video processor can therefore provide a replay controller for controlling replay of a stored version of the 3D video signal in response to user selection of one or more of the graphical representations.

More generally, the arrangement of FIG. 3 can be used to acquire quality information relating to received 3D video, and then allow the operator to review the quality data and, if necessary, the accompanying video material later. The operator may manually select portions for replay, or the video processor could automatically review the stored quality data and select portions for operator review in which there is, for example, a discontinuity in any stored data value, an excursion beyond acceptable limits (for example a depth value excursion beyond an "alarm" threshold such as 10%) or the like.

Accordingly, the depth guide renderer 506 acts as a graphics generator configured to generate a graphical representation of the distribution of the displacements, with respect to a range of possible displacement values, across the pair of images; and the depth guide time plotter 560 acts as a display generator for generating for display the graphical representation in respect of a current pair of images at a current pair display position and in respect of a plurality of preceding pairs of images at other display positions, so as to provide a time-based representation of variations in the distribution of the displacements. In embodiments of the invention, the displacement data acted upon by the graphics generator comprises only a horizontal component of the detected image displacements.

Frame (Edge) Violation

The aim of the Frame (or Edge) Violation detection process is to determine if objects at the left or right edge of the picture are in front of the screen.

A potential problem can occur in 3D television when an object having negative parallax (that is to say, an object which will be displayed by the 3D display as being in front of the plane of the display screen) moves off camera, that is to say, leaves the display. The problem can occur because the object leaves one eye's image before it leaves the other. This configuration does not happen in real life, and so to see it on the display can break the illusion that the viewer is watching a 3D scene. It is particularly a problem where an object moves slowly off the screen to one side or the other.

The question of whether or not an object appears in front of the screen depends on the position of the object relative to the cameras' convergence point. One possible solution therefore is to change the convergence point, such that all objects in view are behind the screen. Another possible solution is to crop the left and right images so as to remove the object from view by either eye. However, this can have other significant and undesirable effects on the artistic composure of the image. A third technique is to crop just one of the images, so as to reduce the presence of the object in that image such that it matches the other image. This is known as adding a "floating window" or "floating crop" to the image. With a floating window, the edges of the left and right images are cropped dynamically in dependence upon which objects are at or near the edge of screen. The value of a temporary floating window of this nature is that if it is carefully carried out, there is a good chance that the user may not even notice its presence.

In other words, if an appropriate floating window has not been applied but an object is near the left or right edge of the image and is in front of the screen plane, the image can appear unnaturally truncated in one eye. For instance, an object in front of the screen on the left edge of the picture will appear truncated in the right eye. This is because the right eye would expect to see more of the object than the left eye, as if the object were behind a window around the screen. As mentioned, this apparently incorrect truncation of objects in the scene can cause discomfort to the viewer and can destroy the 3D illusion.

Objects at the left or right edge of the image and in front of the screen will be referred to as "frame violations".

Figure 13:
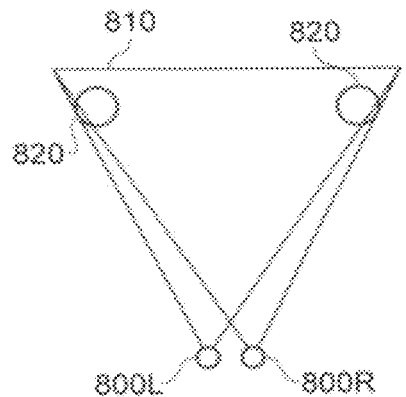
FIG. 13 schematically illustrates a frame violation situation.
Figure 14:
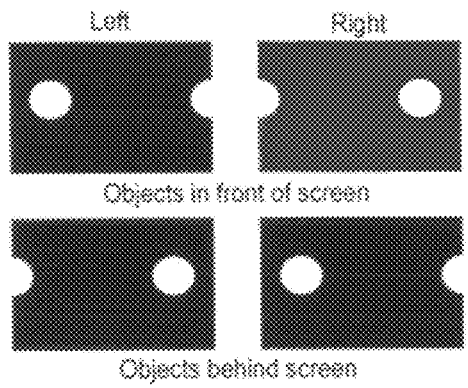
FIG. 14 schematically illustrates positive and negative parallax in respect of objects near the left and right edges of a 3D image.

FIG. 13 schematically illustrates the views of a viewer's left and right eyes, in the context of a 3D image displayed on a display screen 810. Two example objects 820 are shown, displayed by the 3D system as being in front of (nearer to the viewer than) the screen 810. An upper row of FIG. 14 schematically illustrates the left and right eye views of such objects. The viewer will feel that the objects are incorrectly cropped, that is to say, they are cropped for the "wrong" eye. This is partly because the illusion of 3D display relies on the user's belief that the display screen represents a window into a 3D world. Real windows will crop objects behind them in an expected way, but real windows do not give rise to the type of incorrect cropping shown in the upper row of FIG. 14. For comparison, the lower row of FIG. 14 schematically illustrates the acceptable type of cropping that would have occurred if the objects had been at the edge of the frame but behind the plane of the display screen 810.

Embodiments of the invention therefore provide an image analysis apparatus including the frame violation detector 540, for processing a pair of 3D images representing left eye and right eye views of a scene.

Figure 15:
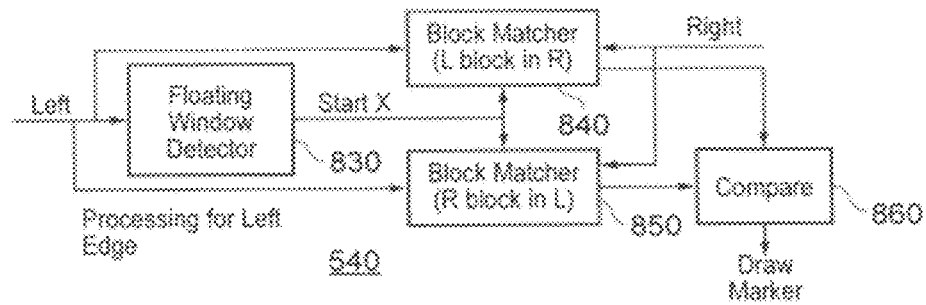
FIG. 15 schematically illustrates a frame violation detector.

FIG. 15 schematically illustrates the frame violation detector 540 in more detail. The frame violation detector 540 comprises a floating window detector 830, a left block matcher 840, a right block matcher 850 and a comparator 860. FIG. 15 represents the functionality used for detection of left edge frame violation. Exactly the same technique is used (though with left and right exchanged) for detecting right edge frame violation, but for clarity of the diagram, only the left edge detection is illustrated.

To detect frame violations on the edge of the screen, the image is divided into blocks, processing just 2 columns of 16×16 pixel blocks on each of the left and right edges of the picture. The left block matcher 840 searches for each left image block (within the 2 columns at each edge of the left image) in the right image. The right block matcher 850 searches for each right image block (within the 2 columns at each edge of the right image) in the left image. The detection within the region of two columns of blocks from the image edge represents detection within a threshold distance (in this example, 32 pixels) from the edge. Other threshold distances could be used instead. In the present example, the threshold distances are the same for both edges, but they could be different if desired.

At the left hand edge, if a left image block is found in the right hand image, then there is no frame violation. But if the right image block is found in the left image (but further to the right than its location in the right image), but the left image block is not found in the right image, then a frame violation has occurred.

A corresponding test is applied to the right edge of the picture.

The test can be summarised in that if an image feature within a threshold distance (such as 32 pixels) of the left edge of the left image is not found in the right image, or if an image feature within a threshold distance of the right edge of the right image is not found in the left image, then a frame violation is detected to be present.

However, if a floating window already exists on the input video, then processing to detect frame violations should only start on the new edge of the picture, which is to say that frame violation detection takes place within areas of the images excluding any detected image crops (floating windows). In other words, the 2 columns of pixel blocks to be tested should be aligned so as to start at the inside edge of the floating window, or in other words, at the first column of pixels not to have been cropped by the floating window. The threshold distance therefore starts at (measures from) the inner edge of the detected floating window.

If a floating window has been previously correctly applied to the images, then there would normally be no frame violation. However, there could still be a detected frame violation even if a floating window has been applied, for example because the floating window is not sufficiently large to mask the frame violation.

So the frame violation detector 540 provides an image crop detector to detect the presence of an image crop at a lateral (left or right) edge of one or both of the images, by providing a pre-processing step to detect floating windows (on the left edge of the left image, and right edge of the right image) is provided by the floating window detector, which detects the presence of a strip of black video at the left and right hand edges of the images and, if one is detected, measures its width. Note that floating windows are normally assumed to be black, formed as a vertical strip against a lateral edge of the image and over the full height of the image. However, instead of black they can simply be of a uniform colour. Accordingly, the image crop detection process can detect the presence of a portion of uniform colour occupying the full image height at a lateral edge of one of the images. Often a dark colour is used. Between zero and four floating windows can be detected in respect of an image pair (the four being one at each lateral edge of the two images). If two or more adjacent floating windows are detected at a particular edge, for example multiple adjacent regions each of uniform (but different) colour, the full height of the image, then the system treats them as a single composite floating window of the combined width of the multiple regions.

For instance, if a 3-pixel-wide floating window is detected on the left hand edge of the left image, then processing (by the left block matcher 840 and the right block matcher 850) to detect frame violations on the left edge of the picture is only started 3 pixels in from the original edge of the picture.

Where a frame violation is detected, a display of the images can be augmented by the apparatus so as to show an indicator arranged to indicate the location relative to the images of a (or each) detected frame violation. For example, an arrowhead or other marker can be drawn into a texture buffer (background: black, with zero alpha) which can be overlaid on the video output to indicate the presence and location of a frame violation. In other words, the same technique is used as by the depth guide renderer to introduce the warning marker into the image for display on the display screen 210. An example 870 of such a warning marker is illustrated schematically in FIG. 8, in respect of a bird flying at the edge of the captured image, in front of the convergence point of the cameras.

As before, the frame violation detection processing is carried out on quarter-size video, using a single SPU to process each edge (so 2 SPUs in total).

Focus Mismatch Detection

Embodiments of the invention provide a focus mismatch warning feature which uses image analysis to detect and warn the user of any differences in focus between the left and right images. The algorithm attempts to detect an overall global mismatch in focus levels, and then goes on to use data derived by the block matcher 504 of the depth detector 500 to detect and display specific areas of the image that might have a mismatch in focus. The algorithm as implemented below represents the operation of an image analysis apparatus for processing an image to generate an image focus indicator, comprising a focus detector configured to detect respective local focus estimates for a plurality of blocks of the image, and to combine the local focus estimates to generate the image focus indicator for that image The global focus mismatch detection process is intended to detect a mismatch in the focus of the whole scene, irrespective of whether the whole image is in focus or not. Thus it accounts for depth of field and artistic defocus effects. The sensitivity to focus mismatches is greater, however, when at least one of the images is substantially in focus.

The local focus mismatch detection detects local focus estimates by detecting image contrast in a group of pixels around some or each of the respective blocks. It can, in embodiments of the invention, use the independently generated horizontal offset data to compare the focus of corresponding localised areas of the left and right images. Specific locations of mismatch can thus be indicated to the user. However, since the block match process only generates horizontal offset information at vertical edges found in one image (the left image in the present embodiments), localised focus mismatch warnings will only be generated at locations where the left image is in good focus.

Figure 16:
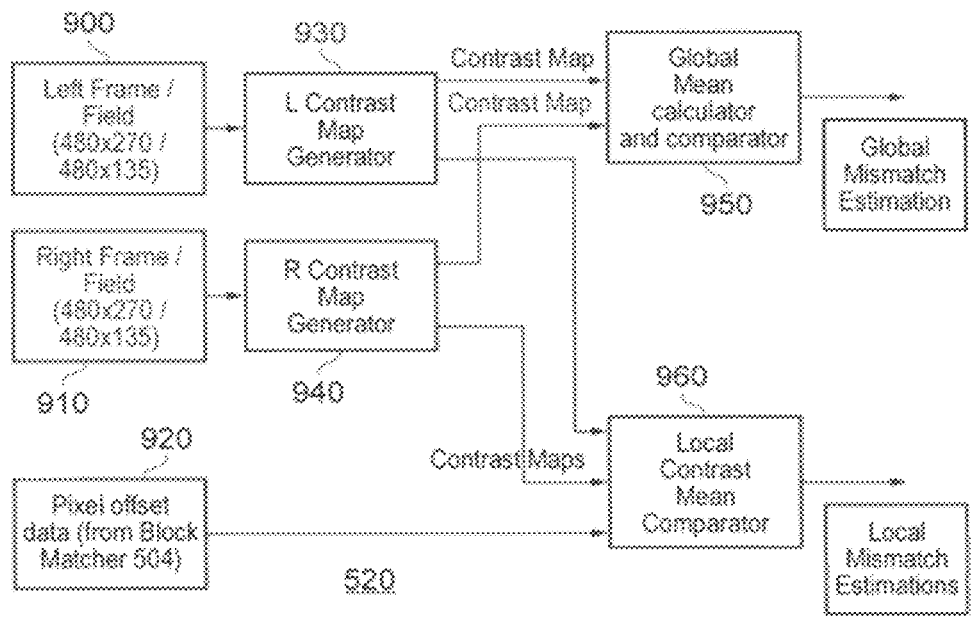
FIG. 16 schematically illustrates a focus mismatch detector.

The focus detector 520 is schematically illustrated in FIG. 16.

The inputs to the focus detector 520 are the left (900) and right (910) images, in the quarter size format, and the pixel offset data generated in respect of that pair of left and right images by the block matcher 504.

The left and right images are passed to respective contrast map generators which operate as SPU processes to generate contrast maps of the left and right images. To do this, in an example embodiment, a group of pixels, for example a square array of pixels such as a 3×3 window, is passed over all possible positions in the image, and the contrast at each point is estimated to be the maximum luminance (brightness) value of pixels within the window minus the minimum luminance (brightness) value of pixels within the window. This is expressed as a value from 0 to 255 in an eight bit representation. The group can, in embodiments of the invention, be positioned around the respective block, so in the present example the single pixel or point relating to a window position (with which that contrast value is associated) can be, for example, the centre pixel position of the 3×3 window.

A global mean calculator and comparator 950 then derives the mean value of contrast across the whole of each of the left and right images to generate respective left and right mean values. The difference between the left and right mean values is calculated and used as the indication of overall focus difference between the left and right images. The global mean calculator and comparator 950 compares the difference value with a threshold in order to generate a decision that there is a significant difference in focus between the left and right images. The presence of a significant difference in focus can be indicated to the user by an appropriate user display. It can also be recorded in the metadata associated with the images.

Figure 17:
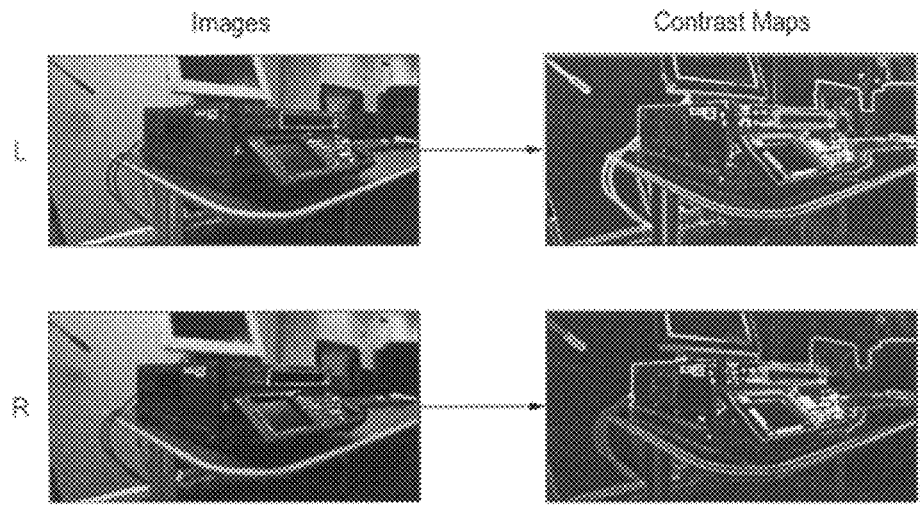
FIG. 17 schematically illustrates two contrast maps.

FIG. 17 schematically illustrates example left and right images and their corresponding contrast maps. The apparatus detects focus indicators (such as global means) in respect of each of the images, and compares the focus indicators to detect whether the pair of images have a similar degree of focus. In the example shown, the left image is rather more in focus than the right image, and so the values generated for the contrast maps are slightly different. The mean contrast is also different between the two contrast maps.

A local focus warning process, forming part of the operation of the focus detector 520 and drawn in FIG. 16 as a local contrast mean comparator can use the horizontal offset data generated by the block matcher 504 to compare the focus between corresponding small areas of the left and right images. In particular, the focus detector can be configured to detect differences between local focus estimates of corresponding areas of the pair of images. As mentioned, the focus detection can be responsive to displacement data (such as the horizontal offset data) indicating displacements between image features in the pair of images, the focus detector being configured to apply the displacement data in the selection of corresponding areas of the pair of images.

The focus detection process therefore makes use of a contrast detector configured to detect image contrast within blocks of each of the pair of images, and a contrast difference detector configured to detect differences in contrast between respective areas of the pair of images, the respective areas being selected for comparison in response to the displacements detected by the block matching process described above.

Note that the block matcher 504 operates only on those small regions of the images for which a vertical edge was detected in the left image. In other words, the contrast difference detection process is arranged not to detect contrast differences in respect of image areas for which no edges were detected by the edge detector.

Also, there may be areas at which the block matcher 504 attempts to derive a horizontal offset value but is not able to do so, perhaps because of a detection of aliasing in the SAD data. So the data output by the block matcher 504 is sparse, in that some picture areas may have associated horizontal offset data, whereas other picture areas may not have any associated horizontal offset data.

The left and right images are considered to be broken up into a fixed grid of 64×60 pixels (at a quarter resolution), or 64×30 for interlaced video. A position within this grid will be referred to as a grid location. The horizontal offset values (if any) within each such block of the grid are combined into a single mean estimate of horizontal disparity for that block. If no horizontal offset values are found within a block, then the block is ignored.

Figure 18:
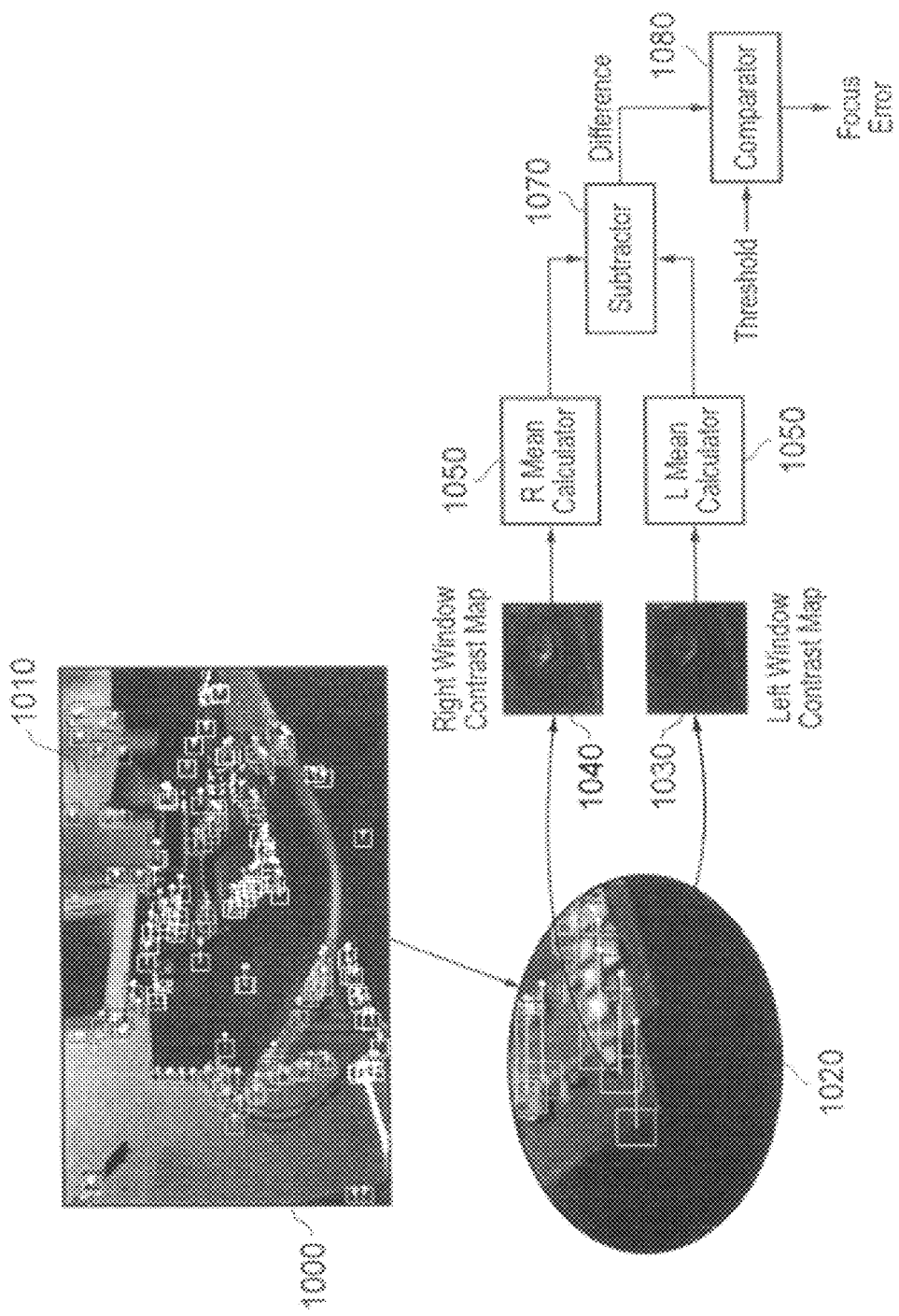
FIG. 18 schematically illustrates a local contrast error detection process.

Referring to FIG. 18, an example image 1000 is shown, with small square icons 1010 indicating image locations at which horizontal offset data was successfully obtained by the block matcher 504. A small area of the image 1000 is shown in expanded form 1020 for clarity of the explanation.

The following part of the process is carried out for each grid location. The left contrast map 1030 relating to a grid location, and the right contrast map 1040 for the location offset by the mean horizontal disparity (as applicable to that grid location) from that grid location are accessed. The mean contrasts of the two sub-areas of the contrast maps are calculated by a left mean calculator 1050 and a right mean calculator 1060 respectively. A subtractor 1070 subtracts one from the other to derive a difference, which may be expressed as an absolute difference.

The difference value can be compared with a threshold by a comparator 1080 to determine whether a local focus error exists in respect of that grid location (that is, the grid location used in respect of the left contrast map 1030 in this embodiment). As the difference (at the output of the subtractor 1070) can be susceptible to errors in the original block matching process, the threshold for detecting local focus differences needs to be 10 times that of the global focus difference. Areas where a local focus difference is detected can be marked on the screen, for example by a red box drawn around them. An example of such a box is shown as a box 1100 in FIG. 8.

Obviously, numerous modifications and variations of the present disclosure are possible in light of the above teachings. It is therefore to be understood that within the scope of the appended claims, the invention may be practised otherwise than as specifically described herein.

Insofar as embodiment of the invention has been described as being implemented, at least in part, by software-controlled data processing apparatus, it will be appreciated that a non-transitory machine-readable medium carrying such software, such as an optical disc, a magnetic disk, semiconductor memory or the like, is also considered to represent an embodiment of the present invention.

The invention claimed is:

1. An image analysis apparatus for processing an image to generate an image focus indicator, the apparatus comprising:
    a focus detector configured to detect respective local focus estimates for a plurality of blocks of the image, and to combine the local focus estimates to generate the image focus indicator for that image, wherein
    the focus detector is configured to detect the local focus estimates by detecting image contrast in a group of pixels around the respective block,
    the group of pixels comprises a square array of pixels centred around the respective block,
    the focus detector is configured to detect image contrast in a group by detecting the difference between the maximum pixel brightness and the minimum pixel brightness in that group,
    the image is an image of a 3D pair of images representing different respective views of a scene,
    the focus detector is configured to detect the image focus indicator in respect of each image of the pair,
    the image analysis apparatus is configured to compare the image focus indicators in respect of the pair of images, to detect whether the pair of images have a similar degree of focus, and
    the focus detector is configured to detect differences between local focus estimates of corresponding areas of the pair of images.

2. Apparatus according to claim 1, in which each block comprises a respective single pixel of the image.

3. Apparatus according to claim 1, in which the apparatus is responsive to displacement data indicating displacements between image features in the pair of images, the focus detector being configured to apply the displacement data in the selection of corresponding areas of the pair of images.

4. An image analysis method for processing an image to generate an image focus indicator, the method comprising:
    detecting respective local focus estimates for a plurality of blocks of the image; and combining the local focus estimates to generate the image focus indicator for that image, wherein the detecting includes detecting the local focus estimates by detecting image contrast in a group of pixels around the respective block, the group of pixels comprises a square array of pixels centred around the respective block, the detecting includes detecting image contrast in a group by detecting the difference between the maximum pixel brightness and the minimum pixel brightness in that group, the image is an image of a 3D pair of images representing different respective views of a scene, the detecting includes detecting the image focus indicator in respect of each image of the pair, the method further comprising comparing the image focus indicators in respect of the pair of images, to detect whether the pair of images have a similar degree of focus, and the detecting includes detecting differences between local focus estimates of corresponding areas of the pair of images.

5. A computer program product comprising a non-transitory machine-readable storage medium on which computer software is stored, which software, when executed by a computer, causes the computer to carry out an image analysis method for processing an image to generate an image focus indicator, the method comprising:

detecting respective local focus estimates for a plurality of blocks of the image; and combining the local focus estimates to generate the image focus indicator for that image, wherein the detecting includes detecting the local focus estimates by detecting image contrast in a group of pixels around the respective block, the group of pixels comprises a square array of pixels centred around the respective block, the detecting includes detecting image contrast in a group by detecting the difference between the maximum pixel brightness and the minimum pixel brightness in that group, the image is an image of a 3D pair of images representing different respective views of a scene, the detecting includes detecting the focus indicator in respect of each image of the pair, the method further comprising comparing the focus indicators in respect of the pair of images, to detect whether the pair of images have a similar degree of focus, and the detecting includes detecting differences between local focus estimates of corresponding areas of the pair of images.

* * * * *